United States Patent [19]

Montgomery

[11] Patent Number: 4,968,283
[45] Date of Patent: Nov. 6, 1990

[54] GAME CALL

[76] Inventor: Steve Montgomery, 4251 Lower Roswell Rd., Marietta, Ga. 30068

[21] Appl. No.: 422,156

[22] Filed: Oct. 16, 1989

[51] Int. Cl.$^5$ .............................................. A63H 5/00
[52] U.S. Cl. ...................................... 446/419; 446/397
[58] Field of Search ............... 446/419, 397, 421, 418; 84/402; 43/1; 119/29

[56] References Cited

U.S. PATENT DOCUMENTS

| | | | |
|---|---|---|---|
| 2,372,680 | 4/1945 | Pitar | 446/419 X |
| 2,763,954 | 9/1956 | Bunker | 446/419 X |
| 3,521,518 | 7/1970 | Cohen | 84/402 |
| 4,165,671 | 8/1979 | DeBose | 446/419 X |
| 4,179,973 | 12/1979 | White | 446/419 X |
| 4,610,641 | 9/1986 | Allen | 446/397 |

Primary Examiner—Mickey Yu
Attorney, Agent, or Firm—James B. Middleton

[57] ABSTRACT

A game call imitates the scratching sound made by turkeys and other animals in order to attract the animals. The game call includes a tube having a rough inner surface, with a quantity of granular material flowable over the rough surface. A scratching sound is generated, and the sound is controlled by varying the frequency of tipping of the device to vary the flow of the granular material. The outside of the device is camouflaged by painting, or by inserting within the knit sock. The knit sock is water repellent, and can provide extra length to carry the device.

8 Claims, 1 Drawing Sheet

U.S. Patent
Nov. 6, 1990
4,968,283
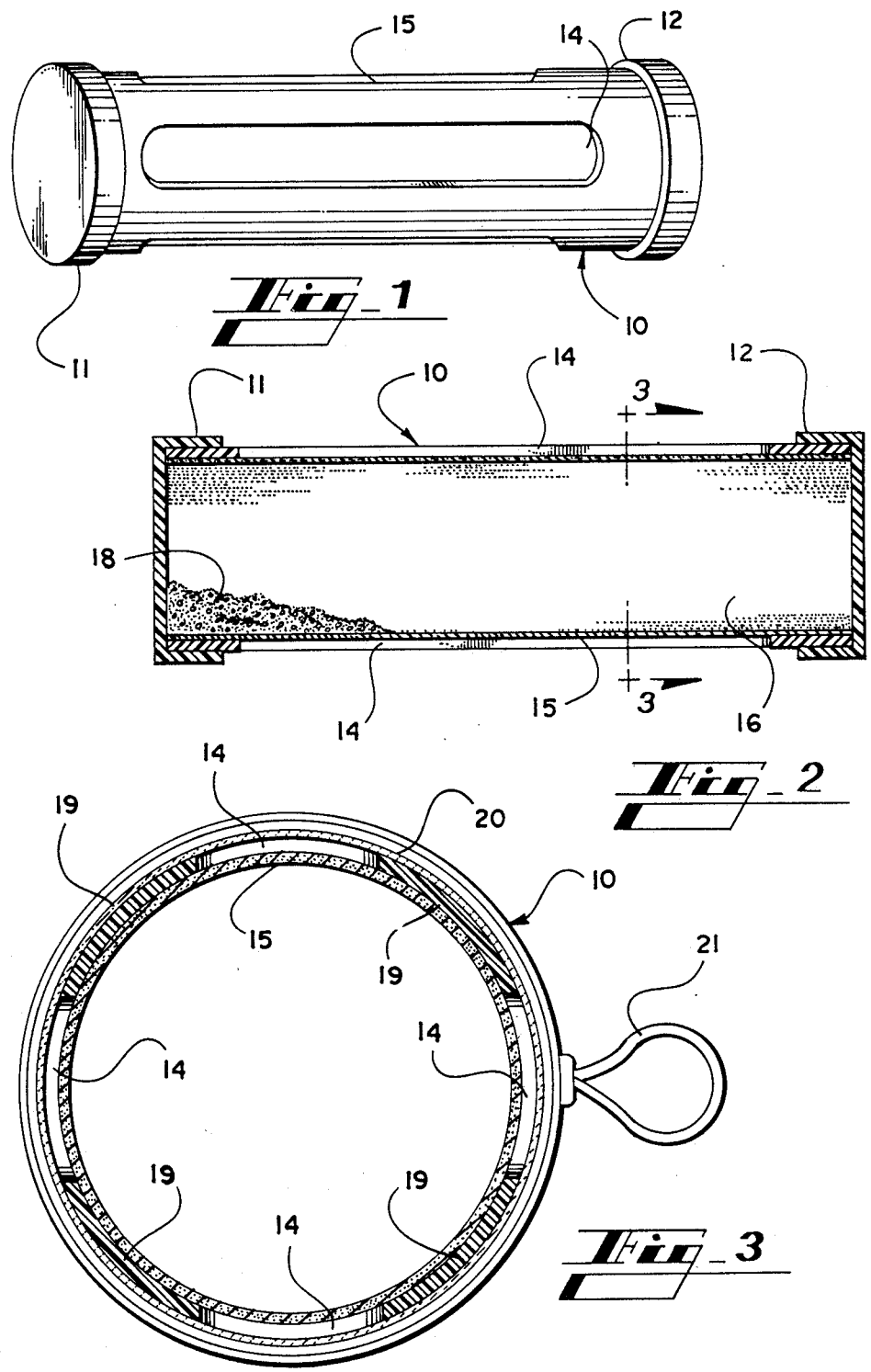

GAME CALL

INFORMATION DISCLOSURE STATEMENT

When a hunter is in quest of game, the hunter very often attempts to imitate sounds made by the animal being hunted, with the idea that animals are usually attracted by like animals. One of the more common sounds attempted in an attempt to attract an animal is the mating call. Other sounds frequently rely simply on the gregariousness of the particular animals.

Some animals make scratching sounds, and these scratching sounds tend to attract other like animals. A number of devices have been created wherein one member scratches on another member to produce the desired sound. Two versions of these instruments are illustrated in Wisor U.S. Pat. No. 3,208,184 and Orzetti U.S. Pat. No. 3,716,943. While these two patents disclose apparatus that physically utilizes a scratching apparatus, both devices are claimed to produce a more vocal sound, as made by a turkey. Thus, the prior art does not include a device for providing the scratching sounds in imitation of scratching sounds made by various animals.

SUMMARY OF THE INVENTION

This invention relates generally to game calls, and is more particularly concerned with a game call for producing a scratching sound in imitation of scratching sounds made by various animals.

The present invention provides a generally hollow body having a rough inner surface. The hollow body contains a quantity of granular material that is loose within the body so it can flow along the rough inner surface of the body. The hollow body is closed to prevent loss of the granular material. The body is so constructed as to vibrate to propagate sounds created by the flow of granular material over the rough inner surface.

BRIEF DESCRIPTION OF THE DRAWINGS

These and other features and advantages of the present invention will become apparent from consideration of the following specification when taken in conjunction with accompanying drawings in which:

FIG. 1 is a perspective view showing one form of game call made in accordance with the present invention;

FIG. 2 is a longitudinal cross-sectional view taken through the game call of FIG. 1; and, FIG. 3 is an enlarged cross-sectional view taken substantially along the line 3–3 in FIG. 2.

DETAILED DESCRIPTION OF THE EMBODIMENT

Referring now more particularly to the drawings, and to that embodiment of the invention here presented by way of illustration, the game call shown in FIG. 1 includes a body generally designated at 10, and caps on each end of the body 10, the caps being designated at 11 and 12. It will be noted that the body 10 defines a plurality of peripheral openings 14; and, a sleeve 15 is received within the body 10 and closes the openings Attention is directed to FIG. 2 of the drawings for a better understanding of the construction of the device shown in FIG. 1. First, it will be seen that the material of the body 10 and the caps 11 and 12 are indicated as plastic material. One successful embodiment of the invention has been made from polyvinylchloride (PVC) pipe. Such pipe is readily available in a variety of sizes, and it is convenient to obtain a length of pipe sufficient to form the body 10, and cut the openings 14 therein. Conventional pipe caps are available as the caps 11 and 12, and the caps can be easily glued into place with conventional cements. Obviously many other plastic pipes or the like may be used instead of the PVC. By way of example, one might use chlorinated polyvinylchloride (CPVC), acrylonitrile butadienestyrene (ABS), polycarbonate and other plastic materials, as well as wood, aluminum, cardboard or pressed board. In general, any reasonably strong material that will tend to vibrate somewhat to produce, or reproduce, sound. Because of this last requirement, one would generally avoid polystyrenes because of the energy absorbing properties, though some styrene content will not necessarily prevent a material from being usable, for example the ABS.

Once the body 10 has been prepared with the openings 14, the tube 15 must be inserted within the body 10. The tube 15 comprises a piece of sandpaper or the like. By the term "sandpaper", it is intended to include the entire range of materials having a flexible sheet material substrate with a granular material such as silicon dioxide in the form of quartz, sand, or the like, emery, ground glass, and virtually any other reasonably hard, granular material. It is also possible that a unitary material might be used such as a piece of metal having a rough surface, and including sheet metal that is sufficiently crinkled to provide the desired rough surface.

The selected material will be rolled into a tube and appropriately glued or otherwise fixed to retain the cylindrical shape. The tube is then inserted into the body 10, and at least one of the caps 11 and 12 can be fixed in place. Before the other cap is fixed in place, a quantity of granular material must be placed inside the opening 16 of the body 10. The granular material may also be virtually any material that is reasonably hard, having a somewhat crystal-line structure to provide appropriate sounds as the granular material slides across, or flows over, the rough surface of the tube 15. It has been found that silica gel works quite well, but one might also use ground glass, sand, small stones and even popcorn kernels. In FIG. 2, a quantity of granular material is indicated at 18.

As is mentioned above, it is contemplated that the present invention might be used to imitate a number of different animals that may produce a scratching sound; however, by way of example, and not by way of limitation, the following discussion will be directed to use of the device as a turkey call.

Turkeys are known to make a number of vocal sounds; however, when a turkey is feeding, the turkey makes scratching sounds. More specifically, a wild turkey will use its feet to rake the dry leaves, clearing the ground to find food under the leaves. This scratching, or raking, tends to have a particular rhythm that is recognized by other turkeys. As a result, when one turkey begins to scratch, or rake the ground, other turkeys hear the scratching sound and join the first turkey. As a result of this phenomenon, if a hunter can imitate the scratching sound of the turkey while feeding, the sound can be used as a call to attract turkeys. In using the present invention, the granular material 18 will be generally at one end of the body 10 as is shown in FIG. 2. The body 10 will then be tipped so the granular material 18 will slowly flow along the rough inner surface of the tube 15, and the granular material 18 scraping across the rough surface of the tube 14 will create a scratching or rasping sound. This sound causes the tube 15 to vibrate so the sound of the granular material flowing across the rough surface is somewhat amplified. It is thought that the body 10 does not enter into the sound propagation to any great extent; however, the body 10 can absorb too much of the sound if the body is fabricated from the wrong material. The above stated guidelines should therefore be followed.

From the foregoing description, it will be readily recognized that the quality of the sound made by the device of the present invention is largely dependent on the skill of the user. If a hunter desires to attract turkeys, the hunter must listen to the natural scratching sound made by feeding turkeys, then utilize the device of the present invention in an effort to imitate that sound. For a slow scratching sound, the body 10 can be tipped gently to allow the granular material 18 to flow somewhat slowly from one end to the other. The repetitity of tipping the body back and forth will change the rhythm of the scratching or raking sounds. If a more nearly constant scratching sound is required, the body 10 can be shaken rapidly back and forth so the granular material 18 remains generally spread along the length of the body 10 and moves reciprocally therein. Yet another sound can be created by shaking the device vigorously so the granular material 18 will impact on each of the caps 11 and 12 with a short time duration of scratching sound between the two impacts. This last motion would be more nearly usable as a musical instrument having a sound in the general vicinity of marocos.

Attention is next directed to FIG. 3 of the drawings. FIG. 3 is a transverse cross-sectional view through the body 10 of the device shown in FIGS. 1 and 2, and shows that there are four of the openings 14. The tube 15 is within the body 10, lying against the remaining portion of the body 10, the body having four ribs designated at 19. Again, it should be mentioned that the circular shape of the device is convenient because of the ready availability of pipe having appropriate dimensions, but the device will work equally well with other cross-sectional shapes. A polygon having from three sides up will operate quite well for the present invention.

One additional aspect of the present invention to be considered is the outside surface of the device. Most of the plastic pipes are made in a white or off-white color which will be extremely noticeable in the woods. As a result, it is desirable to provide a surface on the device in the nature of camouflage. One obvious means for providing this surface is to paint the outer surface of the entire device, the paint being applied in any one of the well known camouflage patterns. Painting the surface is quite effective, and achieves the desired end of making the game call unnoticeable in a wooded environment.

FIG. 3 illustrates a different means for providing a camouflage surface on the device. It has been found that, rather than paint the device, one can obtain knit nylon fabric that already has a camouflage pattern. This nylon fabric can be simply slipped over the entire device of the present invention and appropriately secured at each end. The fabric is indicated at 20 in FIG. 3 of the drawings where it will be seen that the fabric 20 completely surrounds the body 10. Thus, nylon fabric in the form of a long sock can be slipped over the body 10 and the caps 11 and 12. Knots or other fastening means can be used at each end to contain the game call. A further advantage is that one might provide an extra length of the sock 20 to provide a loop 21 at one end of the device as shown in FIG. 3. The loop 21 can be conveniently carried on a hunter's belt or provide a handle for carrying. Additionally, the nylon sock is water repellant for protection of the device.

The above description sets forth the general specifications for producing the device of the present invention. By way of further example, one successful embodiment has been made from PVC pipe having a 1 ½ inch inside diameter, and a length of 9 ½ inches. There are four openings 14, each of the openings 14 being 7 inches long and ¾ inch wide, the openings being substantially equally spaced apart as is shown in FIG. 3 of the drawings. The tube 15 is made of sandpaper with the grit side facing inwardly, the resulting tube 15 having an outside diameter of about 1 ½ inches and a length of about 9 ½ inches. The granular material 18 comprises silica gel, and PVC caps are utilized as the caps 11 and 12, the caps being glued in place. This construction has been found to be quite satisfactory as a turkey call, and numerous other sounds can be generated as discussed above.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A game call comprising a body having opposed ends, a tubular member within said body extending between said opposed ends, and a cavity defined within said tubular member and having a rough inner surface throughout said cavity, means for closing both said opposed ends of said body, a quantity of loose, hard granular material within said cavity, said means for closing both said opposed ends of said body acting to retain said granular material within said cavity.

2. A game call as claimed in claim 1, said body defining peripheral openings therein, said openings being closed by said tubular member, the arrangement being such that movement of said granular material across said rough surface generates a sound, and said peripheral openings in said body allow escape of sound generated.

3. A game call as claimed in claim 2, said tubular member comprising a piece of sandpaper having grit thereon, said grit constituting said rough surface.

4. A game call as claimed in claim 3, said body comprising a length of pipe having said openings cut therein, said means for closing the ends of said body comprising pipe caps fixed to said length of pipe.

5. A game call as claimed in claim 4, and further including a camouflage surface covering said body.

6. A game call as claimed in claim 5, said camouflage surface comprising a knit fabric covering said body.

7. In a method for attracting animals wherein one imitates a sound made by one animal for the purpose of attracting like animals, the improvement comprising the steps of flowing a hard granular material over a rough surface to cause a scratching sound to be generated, and repeating the step of flowing a hard granular material over a rough surface with a frequency to simulate sounds made by the animal to be attracted.

8. In the method as claimed in claim 7, the further steps including placing the rough surface within an enclosure with ends for containing the granular material, and wherein the said step of flowing a hard granular material over a rough surface includes the steps of tipping the enclosure to cause said granular material to flow from one end to the other.

* * * * *